United States Patent
Buchhauser et al.

(10) Patent No.: US 9,366,416 B2
(45) Date of Patent: Jun. 14, 2016

(54) LENS AND LED RETROFIT LAMP

(71) Applicant: OSRAM GmbH, Munich (DE)

(72) Inventors: Dirk Buchhauser, Shenzhen (CN);
Qihui Zhang, Shenzhen (CN);
HongWei Zhang, Shenzhen (CN); Jing Lin, Shenzhen (CN)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/436,098

(22) PCT Filed: Oct. 16, 2013

(86) PCT No.: PCT/EP2013/071662
§ 371 (c)(1),
(2) Date: Apr. 16, 2015

(87) PCT Pub. No.: WO2014/063973
PCT Pub. Date: May 1, 2014

(65) Prior Publication Data
US 2015/0260374 A1  Sep. 17, 2015

(30) Foreign Application Priority Data

Oct. 23, 2012 (CN) .......................... 2012 1 0407756

(51) Int. Cl.
*F21V 5/04* (2006.01)
*F21V 13/04* (2006.01)
*G02B 19/00* (2006.01)
*F21K 99/00* (2016.01)
*F21V 5/00* (2015.01)
*F21V 7/00* (2006.01)
*F21V 7/04* (2006.01)
*F21Y 101/02* (2006.01)

(52) U.S. Cl.
CPC . *F21V 13/04* (2013.01); *F21K 9/10* (2013.01); *F21K 9/50* (2013.01); *F21V 5/007* (2013.01); *F21V 5/04* (2013.01); *F21V 7/0091* (2013.01); *F21V 7/04* (2013.01); *G02B 19/0028* (2013.01); *G02B 19/0061* (2013.01); *G02B 19/0066* (2013.01); *F21Y 2101/02* (2013.01)

(58) Field of Classification Search
CPC .. G02B 3/0062; G02B 27/096; G02B 6/0068; G02B 6/0053; G02B 3/0006; G02B 5/045; G02B 27/22142; G02B 19/0066; G02B 19/028; G02B 19/061; F21V 13/04; F21V 5/007; F21V 5/04; F21V 7/0091; F21V 7/04; F21K 9/10; F21K 9/50
See application file for complete search history.

(56) References Cited

U.S. PATENT DOCUMENTS

| 6,536,923 B1* | 3/2003 | Merz | F21S 48/215 362/245 |
| 2002/0080615 A1* | 6/2002 | Marshall | F21V 5/04 362/333 |
| 2009/0128921 A1* | 5/2009 | Roth | F21V 5/04 359/641 |

* cited by examiner

*Primary Examiner* — Thomas M Sember
(74) *Attorney, Agent, or Firm* — Viering, Jentschura & Partner mbB

(57) ABSTRACT

Various embodiments may relate to a lens for a lighting assembly. The lens includes a bottom surface, a top surface and a side surface joining the bottom surface and the top surface. The bottom surface includes an incident surface, and the top surface includes an emergent surface, wherein the side surface includes a first side surface part and a second side surface part arranged in sequence in a direction from the top surface to the bottom surface, and the first side surface part and the second side surface part are defined by different curved surfaces and both are configured as reflection surfaces.

10 Claims, 4 Drawing Sheets

LENS AND LED RETROFIT LAMP

RELATED APPLICATIONS

The present application is a national stage entry according to 35 U.S.C. §371 of PCT application No.: PCT/EP2013/071662 filed on Oct. 16, 2013, which claims priority from Chinese application No.: 201210407756.9 filed on Oct. 23, 2012, and is incorporated herein by reference in its entirety.

TECHNICAL FIELD

Various embodiments may relate to a lens and an LED retrofit lamp.

BACKGROUND

In the illumination field, the traditional halogen lamp usually can easily create scallop-shaped light distribution, but it is hard for an LED lamp to create the scallop-shaped light distribute.

Some solutions for the LED lamp to create the scallop-shaped light distribution are also provided in the related art, but all of these solutions realize the same via reflector. It is also provided in the related art some solutions using lens, but the lens is configured with a complex shape and good effect cannot be obtained.

SUMMARY

Therefore, various embodiments provide a lens and an LED retrofit lamp that may provide emergent-light illumination creating the scallop-shaped light distribution and have advantages such as high luminous efficiency.

A lens for a lighting assembly is provided according to various embodiments. The lens include a bottom surface, a top surface and a side surface joining the bottom surface and the top surface, wherein the bottom surface includes an incident surface, and the top surface includes an emergent surface, characterized in that the side surface includes a first side surface part and a second side surface part arranged in sequence in a direction from the top surface to the bottom surface, and the first side surface part and the second side surface part are defined by different curved surfaces and both are configured as reflection surfaces. Since the first side surface part and the second side surface part as reflection surfaces are defined by different curved surfaces, possibility of forming different light distributions at edges and center of the scallop-shaped light distribution is provided.

According to various embodiments, the first side surface part receives first incident light beams from the incident surface and reflects the same to the emergent surface to form first emergent light beams, and the second side surface part receives second incident light beams from the incident surface and reflects the same to the emergent surface to form second emergent light beams, the emergent surface receives third incident light beams from the incident surface and emerges the same directly to form third emergent light beams, the first, second and third emergent light beams jointly form the scallop-shaped light distribution, wherein the second emergent light beams and the third emergent light beams form a central part of the light distribution, and the first emergent light beams form edge parts at two sides of the central part of the light distribution. Therefore, good scallop-shaped light distribution is ensured.

According to various embodiments, the first side surface part and the second side surface part are both configured as total internal reflection surfaces. As the first side surface part and the second side surface part themselves are configured as total internal reflection surfaces, there is substantially no light loss and the luminous efficiency is improved.

Further, a slope of a line tangent to each point on an outline on a cross section of the first side surface part is greater than a slope of a line tangent to each point on an outline on a cross section of the second side surface part. Accordingly, it is ensured the first emergent light beams corresponding to the first side surface part are located in the center, and the second emergent light beams corresponding to the second side surface part are located at the edge parts.

Further, the first side surface part is an oblique straight line in cross section. According to optical simulation effects, the oblique straight line is favorable for forming good scallop-shape light distribution.

Further, the second side surface part is a quadratic rational Bezier curve, a spline curve or a quadratic curve in cross section. The quadratic rational Bezier curve is expressed as:

$$p(t) = \frac{(1-t)^2 \omega_0 v_0 + 2t(1-t)\omega_1 v_1 + t^2 \omega_2 v_2}{(1-t)^2 \omega_0 + 2t(1-t)\omega_1 + t^2 \omega_2}, 0 \le t \le 1,$$

where control vertexes $v_0$, $v_1$ and $v_2$, and weight factors $\omega_0$, $\omega_1$ and $\omega_2$ are set.

Further, the top surface is a horizontal plane. According to optical simulation effects, it is favorable for forming good scallop-shape light distribution when the top surface is a flat surface.

Further, the incident surface defines an accommodation cavity, and includes a first incident surface section that defines a bottom of the accommodation cavity, and a second incident surface section that defines a side wall of the accommodation cavity, wherein the first incident surface section receives the third incident light beams, and the second incident surface section receives the first and second incident light beams, wherein the first incident surface section is configured to control the incident light beams and to enable refractive light to emerge vertically.

Further, the first incident surface section is a spline curve, a circular arc or a quadratic curve in cross section, the second incident surface section is a straight line in cross section. As a result, it is favorable for forming good scallop-shape light distribution.

Further, an angle between the second incident surface section and a vertical direction is 2°-5°. Therefore, it is not only advantageous for transmission of light to the side surface, but also particularly facilitates demoulding when manufacturing the lens.

Various embodiments further relate to an LED retrofit lamp having the above lens, especially used as a wall washer.

The lens and the LED retrofit lamp according to various embodiments may provide emergent-light illumination creating the scallop-shaped light distribution and have advantages such as high luminous efficiency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

In the following detailed description, reference is made to the accompanying drawings, which form a part hereof, and in which is shown by way of illustration specific embodiments in which the invention may be practiced. In this regard, directional terminology, such as "top", "bottom", "front", "back", "leading", "trailing", is used in reference to the orientation of the figures being described. Because components of embodiments of the present invention can be positioned in a number of different orientations, the directional terminology is used for purposes of illustration and is in no way limiting. It is to be understood that other embodiments maybe utilized and structural or logical changes may made without departing from the scope of the present invention. The following detailed description, therefore, is not to be taken in a limiting sense, and the scope of the present invention is defined by the appended claims.

Figure 1:
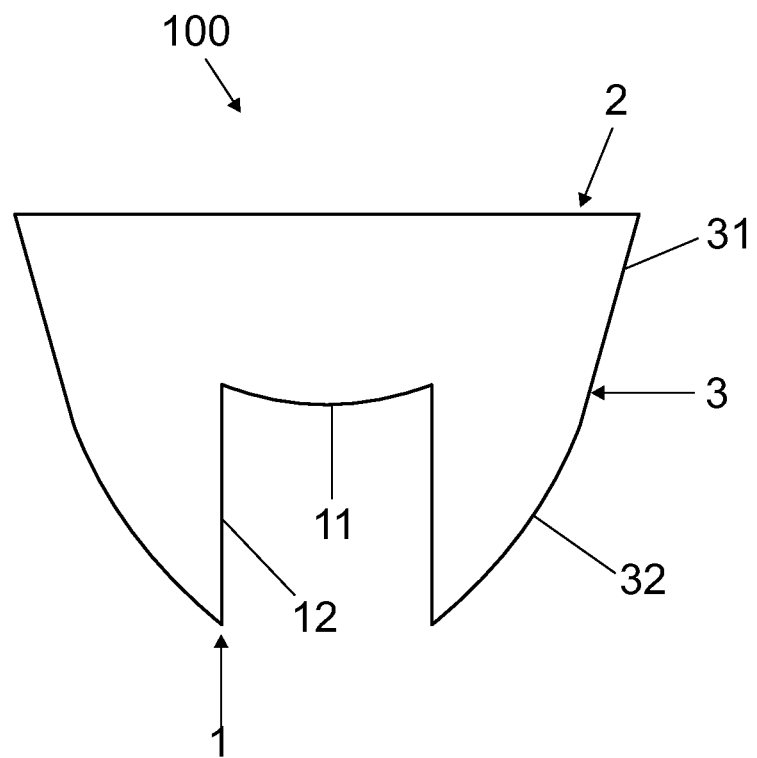
FIG. 1 is a front view of a first embodiment of a lens according to various embodiments.
Figure 2:
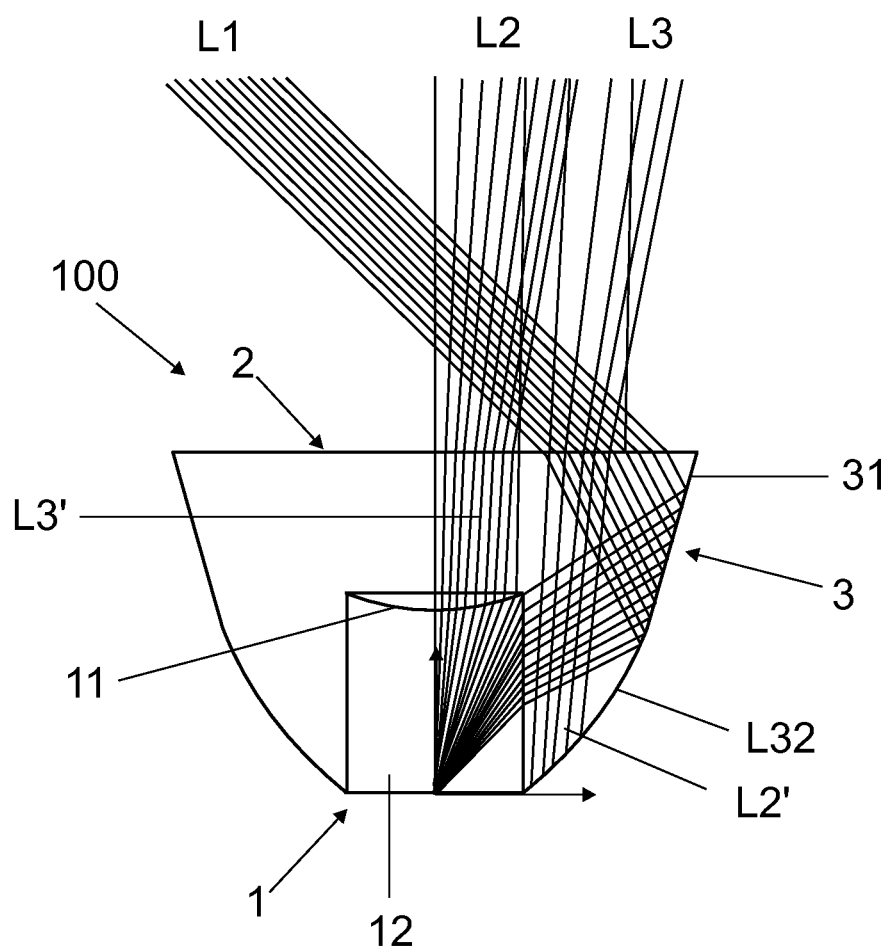
FIG. 2 is an optical pathway diagram of the lens as shown in FIG. 1.

FIG. 1 is a front view of a first embodiment of a lens according to various embodiments; and FIG. 2 is an optical pathway diagram of the lens as shown in FIG. 1.

A lens 100 is configured for a lighting assembly to adjust light distribution of light emitted from a light source 3 of the lighting assembly for forming expected light distribution. The lens according to various embodiments is mainly used for creating the scallop-shaped light distribution, and is especially adapted to an LED lamp to enable the LED lamp to be used as a wall washer. According to various embodiments, this effect is realized via a special lens.

The principle of the lens lies in using sectional configuration of a side surface of the lens to realize central part and two lateral parts of the scallop-shaped light distribution, respectively, thus, it is provided that the side surface is divided into a first side surface part 31 and a second side surface part 32, and the two side surface parts 31, 32 reflect, at different reflection angles, first incident light beams L1' and second incident light beams L2' from an incident surface, so as to form first emergent light beams L1 and second emergent light beams L2 to be corresponding the central part and two lateral parts of the scallop-shaped light distribution, thus realizing the scallop-shaped light distribution.

As shown in FIGS. 1 and 2, the lens 100 includes a bottom surface 1, a top surface 2 and a side surface 3 joining the bottom. surface 1 and the top surface 2, wherein the bottom surface 1 includes the incident surface, and the incident surface defines an accommodation cavity and includes a first incident surface section 11 that defines a bottom of the accommodation cavity, and a second incident surface section 12 that defines a side wall of the accommodation cavity. A light source is provided in the accommodation cavity. The top surface 2 includes an emergent surface. The side surface 3 includes a first side surface part 31 and a second side surface part 32 arranged in sequence in a direction from the top surface to the bottom surface. According to various embodiments, the first side surface part 31 and the second side surface part 32 are defined by different curved surfaces and both are configured as reflection surfaces. In the present embodiment, the reflection surfaces are total internal reflection surfaces so that the light loss is reduced and the luminous efficiency is improved.

Figure 3:
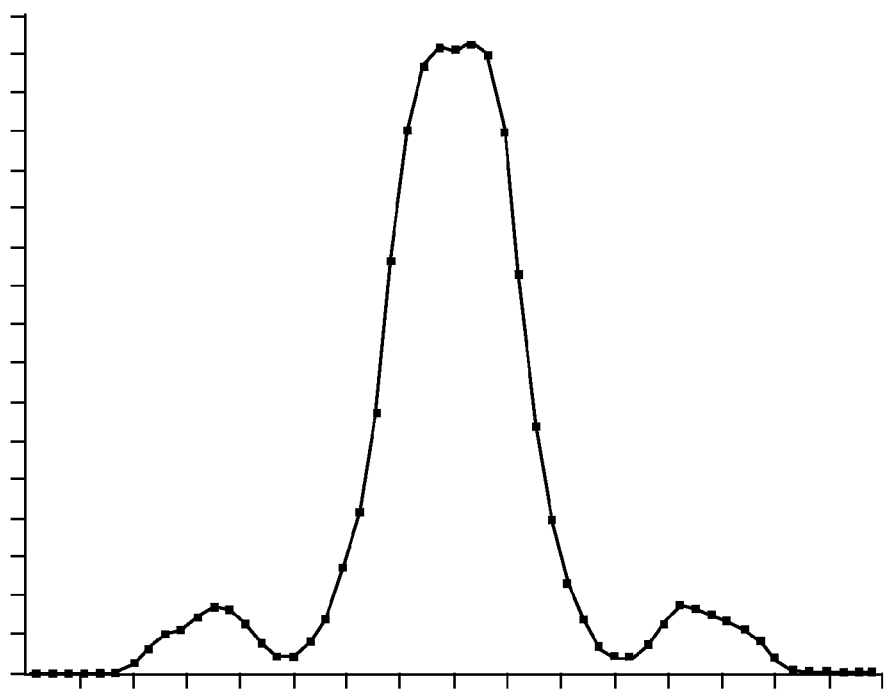
FIG. 3 is a light distribution schematic diagram of the lens according to various embodiments.
Figure 4:
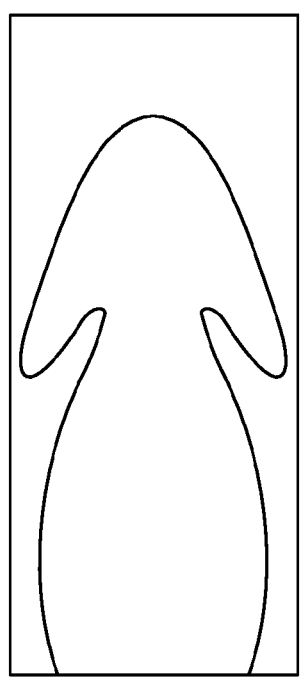
FIG. 4 is a schematic diagram of a light spot created by the lens according to various embodiments.

As mentioned above, by dividing the side surface into the first side surface part 31 and the second side surface part 32, the two side surface parts reflect, at different reflection angles, the first incident light beams L1' and the second incident light beams L2' from the incident surface so as to form the first emergent light beams L1 and the second emergent light beams L2 to be corresponding to the central part and two lateral parts of the scallop-shaped light distribution, thus realizing the scallop-shaped light distribution. As the central part has a high luminous flux, the first incident surface section 11 is so configured that third emergent light beams L3 which is formed after third incident light beams L3' emerge, and second emergent light beams L2, which is formed after reflected by second side surface part 32 and emerged, jointly form the central part of the light distribution. As shown in FIG. 3, in the schematic light distribution diagram of the lens according to various embodiments, a central protruding portion is corresponding to the second emergent light beams L2 and the third emergent light beams L3, and edge portion is corresponding to the first emergent light beams L1, and a light spot as shown in FIG. 4 is created.

In order to adjust the first incident light beams L1' and the second incident light beams L2' to expected positions, a slope of a line tangent to each point on an outline on a cross section of the first side surface part 31 is greater than a slope of a line tangent to each point on an outline on a cross section of the second side surface part 32. In the present embodiment, the first side surface part 31 is an oblique straight line in cross section, that is, it has a conical cubic profile, and the second side surface part 32, in cross section, is a quadratic rational Bezier curve $$p(t) = \frac{(1-t)^2 \omega_0 v_0 + 2t(1-t)\omega_1 v_1 + t^2 \omega_2 v_2}{(1-t)^2 \omega_0 + 2t(1-t)\omega_1 + t^2 \omega_2}, 0 \le t \le 1,$$

where control vertexes $v_0$, $v_1$ and $v_2$, and weight factors $\omega_0$, $\omega_1$ and $\omega_2$ are set to serve a function of collimating light.

In other embodiments not shown, the second side surface part 32 also can be selected as a spline curve or a quadratic curve in the cross section.

In addition, in the present embodiment, the first incident surface section 11 is a spline curve in cross section for the function of controlling incident light and enabling refracted light to emerge vertically. The second incident surface section 12 is a straight line in cross section. An angle between the straight line and a vertical direction is 2°-5°. The emergent surface is a horizontal plane. Therefore, food scallop-shaped light distribution is present well.

In other embodiments not shown, the first incident surface section 11 also can be a circular arc or a quadratic curve in the cross section.

Figure 5:
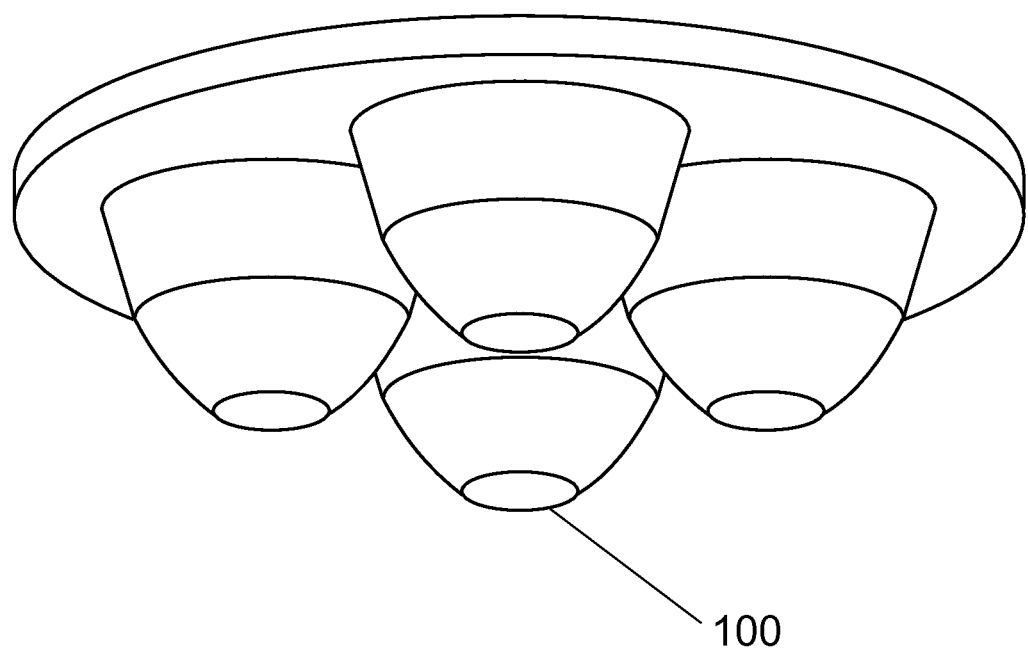
FIG. 5 is a lens array including at least one lens according to various embodiments.
Figure 6:
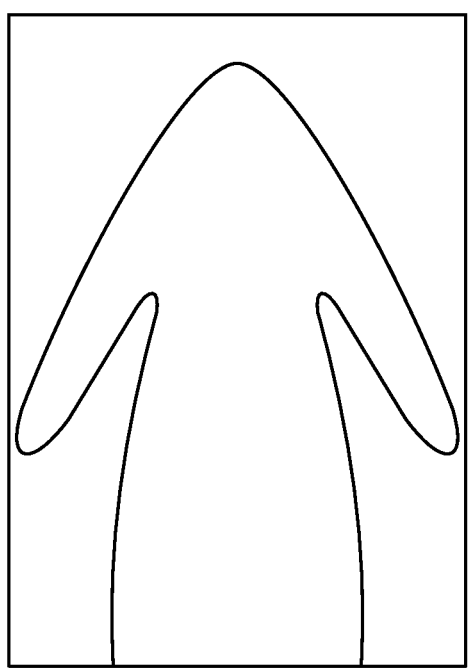
FIG. 6 is a schematic diagram of a light spot created by the lens array as shown in FIG. 5.

FIG. 5 is a lens array including at least one lens according to various embodiments; and FIG. 6 is a schematic diagram of a light spot created by the lens array as shown in FIG. 5. The lens array includes four lenses, i.e. four-in-one lens. Each lens is corresponding to a corresponding light source, and a scallop-shaped light spot also can be realized. The light spot can be slightly adjusted with respect to the light spot as shown in FIG. 4.

In various embodiments, the lens can be made from a plastic or a glass. A common plastic is, e.g. PC. In cases where the lens is made from a plastic, the lens can be formed through an injection molding process, in which situation an inclination angle of the second incident surface section is configured to be particularly favorable for demoulding.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lens for a lighting assembly, the lens comprising:
a bottom surface,
a top surface and
a side surface joining the bottom surface and the top surface,
wherein the bottom surface comprises an incident surface, and the top surface comprises an emergent surface, wherein the side surface comprises a first side surface part and a second side surface part arranged in sequence in a direction from the top surface to the bottom surface, and the first side surface part and the second side surface part are defined by different curved surfaces and both are configured as reflection surfaces,
wherein the first side surface part receives first incident light beams from the incident surface and reflects the same to the emergent surface to form first emergent light beams, and the second side surface part receives second incident light beams from the incident surface and reflects the same to the emergent surface to form second emergent light beams, the emergent surface receives third incident light beams from the incident surface and emerges the same directly to form third emergent light beams, the first, second and third emergent light beams jointly form scallop-shaped light distribution, wherein the second emergent light beams and the third emergent light beams form a central part of the scallop-shaped light distribution, and the first emergent light beams form edge parts at two sides of the central part of the scallop-shaped light distribution.

2. The lens according to claim 1,
wherein the first side surface part and the second side surface part are both configured as total internal reflection surfaces.

3. The lens according to claim 2,
wherein a slope of a line tangent to each point on an outline on a cross section of the first side surface part is greater than a slope of a line tangent to each point on an outline on a cross section of the second side surface part.

4. The lens according to claim 1,
wherein the first side surface part is an oblique straight line in cross section.

5. The lens according to claim 1,
wherein the second side surface part is a quadratic rational Bezier curve, a spline curve or a quadratic curve in cross section.

6. The lens according to claim 1,
wherein the top surface is a horizontal plane.

7. The lens according to claim 1,
wherein the incident surface defines an accommodation cavity, and comprises a first incident surface section that defines a bottom of the accommodation cavity, and a second incident surface section that defines a side wall of the accommodation cavity, wherein the first incident surface section receives the third incident light beams, and the second incident surface section receives the first and second incident light beams.

8. The lens according to claim 7,
wherein the first incident surface section is a spline curve, a circular arc or a quadratic curve in cross section, and the second incident surface section is a straight line in cross section.

9. The lens according to claim 7,
wherein an angle between the second incident surface section and a vertical direction is 2°-5°.

10. An LED retrofit lamp, comprising a lens,
the lens comprising:
a bottom surface,
a top surface, and
a side surface joining the bottom surface and the top surface,
wherein the bottom surface comprises an incident surface, and the top surface comprises an emergent surface, wherein the side surface comprises a first side surface part and a second side surface part arranged in sequence in a direction from the top surface to the bottom surface, and the first side surface part and the second side surface part are defined by different curved surfaces and both are configured as reflection surfaces,
wherein the first side surface part receives first incident light beams from the incident surface and reflects the same to the emergent surface to form first emergent light beams, and the second side surface part receives second incident light beams from the incident surface and reflects the same to the emergent surface to form second emergent light beams, the emergent surface receives third incident light beams from the incident surface and emerges the same directly to form third emergent light beams, the first, second and third emergent light beams jointly form scallop-shaped light distribution, wherein the second emergent light beams and the third emergent light beams form a central part of the scallop-shaped light distribution, and the first emergent light beams form edge parts at two sides of the central part of the scallop-shaped light distribution.

* * * * *